April 10, 1951 A. SLATHAR 2,548,562
PUNCH PRESS CONTROL AND FEED MECHANISM
Filed Dec. 10, 1948 7 Sheets-Sheet 1

FIG 1

Inventor
ARTHUR SLATHAR
By Carlsen & Hoyle

April 10, 1951 A. SLATHAR 2,548,562
PUNCH PRESS CONTROL AND FEED MECHANISM
Filed Dec. 10, 1948 7 Sheets-Sheet 3

Inventor
ARTHUR SLATHAR
By Carlsen & Hazle

April 10, 1951  A. SLATHAR  2,548,562

PUNCH PRESS CONTROL AND FEED MECHANISM

Filed Dec. 10, 1948  7 Sheets-Sheet 5

Inventor
ARTHUR SLATHAR
By Carlsen & Hays

April 10, 1951  A. SLATHAR  2,548,562
PUNCH PRESS CONTROL AND FEED MECHANISM
Filed Dec. 10, 1948  7 Sheets-Sheet 6

Inventor
ARTHUR SLATHAR
By Carlsen & Hazel

Patented Apr. 10, 1951

2,548,562

UNITED STATES PATENT OFFICE 2,548,562

PUNCH PRESS CONTROL AND FEED MECHANISM

Arthur Slathar, Minneapolis, Minn., assignor, by mesne assignments, to Minneapolis-Moline Company, Hopkins, Minn., a corporation of Minnesota Application December 10, 1948, Serial No. 64,561

22 Claims. (Cl. 164—89)

This invention relates generally to improvements in mechanisms for feeding materials to power machinery and more particularly to automatic means whereby angles, bars and the like may be fed into a punch press for punching at desired locations.

In manufacturing there are a great number of situations requiring the punching of angles and other structural shapes at varying intervals along their length, and with openings of different sizes and shapes. Heretofore this work has been done in the ordinary punch press which the operator sets up with stops according to the work, or sometimes the work has been laid out beforehand to locate the places to be punched. All such operations require considerable time and are not very accurate unless performed with more care than the average workman will give them. It is accordingly the primary object of my invention to provide a mechanism which may be associated with the conventional punch press to feed the material thereto automatically and cause the punch to perforate the material with extreme accuracy at preselected locations, and to accomplish this work with minimum attention on the part of the operator and with little if any chance for inaccuracies due to human errors.

Another object is to provide a mechanism of this character incorporating an accurately laid out template for controlling the material feed and punch movements, and which once set up with a proper template will repeatedly take over the control of the material and punch each time a piece of material is started into the machine, without attention further than placing the material in the feed mechanism. Thus great quantities of material may be run off once the machine is set up, and a single operator may readily attend to at least two adjacent machines.

A further object of the invention is to provide in mechanism of this kind means for accurately locating the first punch operation with respect to the end of each piece of material as it enters the machine and then transferring control of the feed and punch to means for selecting the location of all following operations both with respect to each other and with respect to said first operation.

Still another object of my invention is to provide control mechanism which will not only accurately locate the punch operations on the material, but which will also operate in conjunction with the so-called "gagger" punch head to select for each operation any one of a series of punches to thus punch openings of different sizes and shapes as may be required. Thus my invention will accommodate itself to almost every job regardless of the size or position of the holes to be punched.

My invention has such ancillary objects as the provision of mechanism of this kind and for this purpose which is comparatively simple in construction and straightforward in its operation after once having been initially installed and set up, so that it may be operated by workmen of average skill.

These and other more detailed and specific objects will be disclosed in the course of the following specification reference being had to the accompanying drawings, in which—

I have shown and will here describe the control and feed mechanism of my invention as associated with a conventional punch press, designated generally at A, having a massive frame structure including a base B, an overhead guide C for a vertically reciprocating punch head or slide D which is driven from a normal upper position, down toward a die surface E and returns, by means of a crankshaft F powered by a heavy duty motor G. Control of this one cycle operation or working stroke of the punch slide is had by the usual clutch mechanism H which may be electrically controlled to operate the punch each time a circuit to the clutch is closed. A heavy yoke I joins the guide C and die surface E forming a transverse, forwardly opening recess J through which the material, indicated throughout at K, is fed for punching. Any conventional form of die plate L is mounted upon the die surface E.

The punch slide D has a gang of punches, indicated generally at M and making up what is commonly known as a "gagger" head or punch. As here shown five of such punches M are provided and they may be of different sizes or shapes as required for the work. Each punch (see Fig. 5) is vertically slidably mounted in a recess N in the underside of the slide and is urged upwardly by a coil spring O to such position that the punch will fall short of meeting the work on the working stroke of the slide. To move the punches downwardly, to positions at which they will properly engage the work, I provide for each individual punch a wedge bar 10 which is reciprocably mounted through the punch slide D above the punch but in position engaging the upper ends thereof. The wedge bars 10 have cam edges 11 operative when the bars are moved rearwardly from their normal positions to urge the punches downward as will be readily understood.

For selecting the punches I provide for each a fluid motor 12 which may be conveniently operated from the usual shop source of compressed air (not shown), and each motor has a cylinder 13 affixed to a bracket 14 bolted to the front of the slide D with flexible air hoses 15 and 16 leading to front and rear ends of the cylinder. A plunger 17 is slidably mounted in each cylinder and is operatively connected at 18 to the forward end of the associated wedge bar 10 so that the selective admission of air to the front and rear ends of the cylinder will, respectively, drive the wedge rearwardly to set the punch M in operating position, and withdraw the wedge to return the punch to inactive position.

Figure 5:
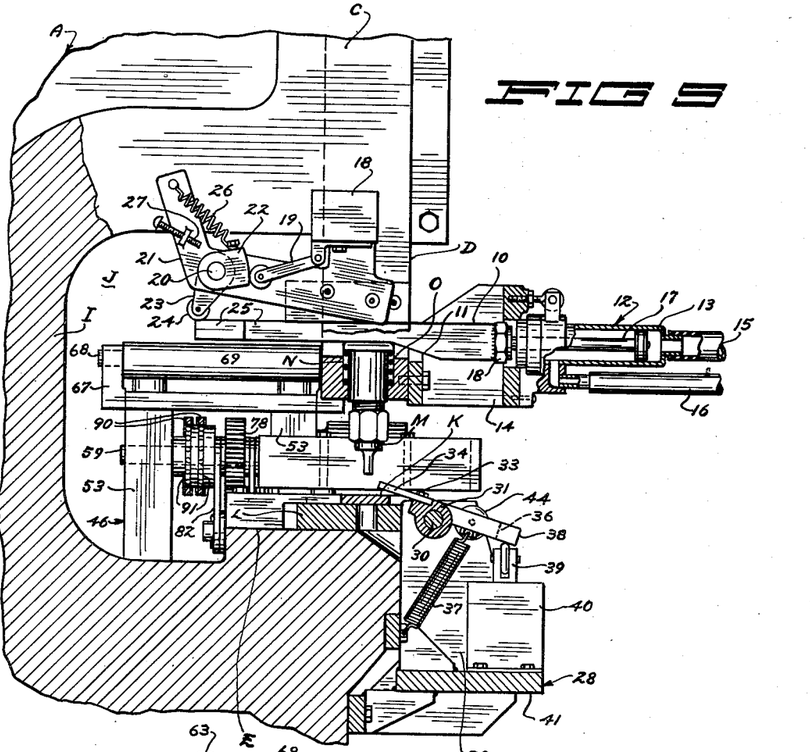
Fig. 5 is a vertical sectional view along the line 5—5 in Fig. 4.

Actuated by the wedge bars 10 as they are thus moved rearwardly is a control switch 18 of conventional type secured to the side of the punch guide C and having an actuating arm 19. A rockshaft 20 is supported beneath the guide, to the rear of the punch slide, in brackets 21 secured on the guide and at one end this shaft carries a cam 22 coacting with the switch arms 19. The shaft 20 further has a number of arms 23 each with a roller 24 and positioned in the paths of the rear ends 25 of the wedge bars 10. Normally a spring 26 holds the cam 22 against a stop 27 on one of the brackets 21 but as any wedge bar 10 moves rearwardly to set one of the punches, the rear end 25 of the bar will strike one of the rollers 24 and rock the shaft 20 in a clockwise direction as viewed in Fig. 5. This movement will cause the cam 22 to engage and move the arm 19 and close the switch 18. As the punch slide D then moves downward on its working stroke the wedge bars will clear the rollers 24 and allow the switch to return to open position, but each time a punch is selected and positioned the switch will be closed as will be understood. In Fig. 5 the switch is shown on its closed position.

A frame structure designated generally at 28 is secured to the front of the press, forward of and below the die surface E, and this frame has ends 29 in which are pins 30 forming pivots for a rock bar 31 extending across the front of the die. Said bar 31 has a plurality of tapped openings 32 into which may be screwed cap screws 33 for holding a bumper or stop 34 in place upon the bar. Said stop 34 has a slot 35 for the cap screws, and this slot together with the great number of openings 32, permits the stop to be located with precision at any desired position along the length of the bar. The stop extends over the die plate L and in one position of the rock bar the stop may be dropped onto the die to lie in the path of the material K traveling lengthwise thereover. Thus the adjustment of the stop permits it to contact the end of the material at any position with reference to the die, as will be understood. The bar 31 has a forwardly, radially projecting arm 36 and a retractile coil spring 37 is stretched between this arm and a part of the frame 28 to normally turn the bar to the position of Fig. 5 at which the stop 34 is raised from the die and will clear the path of the material K. The bar further has another similar arm 38 which overlies a plunger 39 operating in a solenoid 40 secured beneath the arm on a base member 41, forming part of the frame 28. This plunger 39 acts as a stop for the movement of the bar by the spring 37 and the solenoid is so arranged that, upon energization it will thrust the plunger upwardly and force the stop 34 into position for engaging the material, as will be evident.

Figure 4:
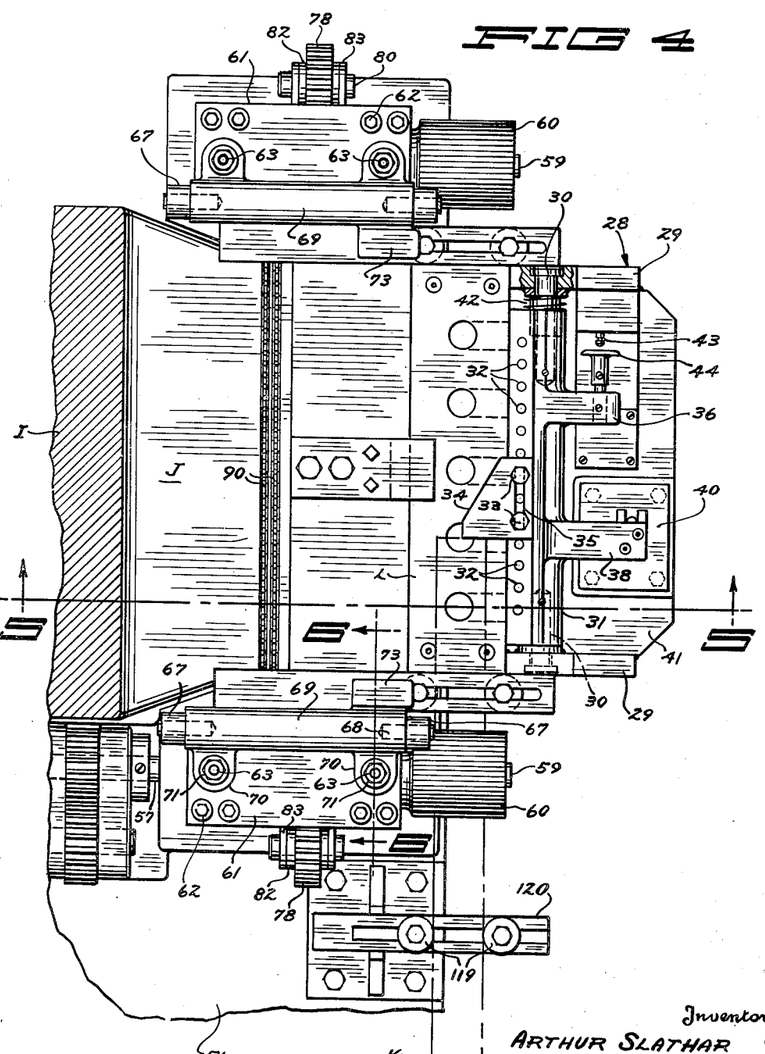
Fig. 4 is an enlarged fragmentary plan and sectional view along the line 4—4 in Fig. 2.

As will be noted in Fig. 4 the rock bar 31 has clearance for limited movement endwise between the frame ends 29 and thus as the material K advances and strikes the stop 34 the parts may move a short distance in the same direction. A coil spring 42 acts to resist this movement and to return the stop and rock bar when the stop clears the material. This movement of the stop is, however, utilized to operate a micro-switch 43 mounted on the frame end 29, an actuator 44 being mounted on the arm 36 to engage the switch for this purpose. The control function of this micro-switch will presently appear.

Figure 2:
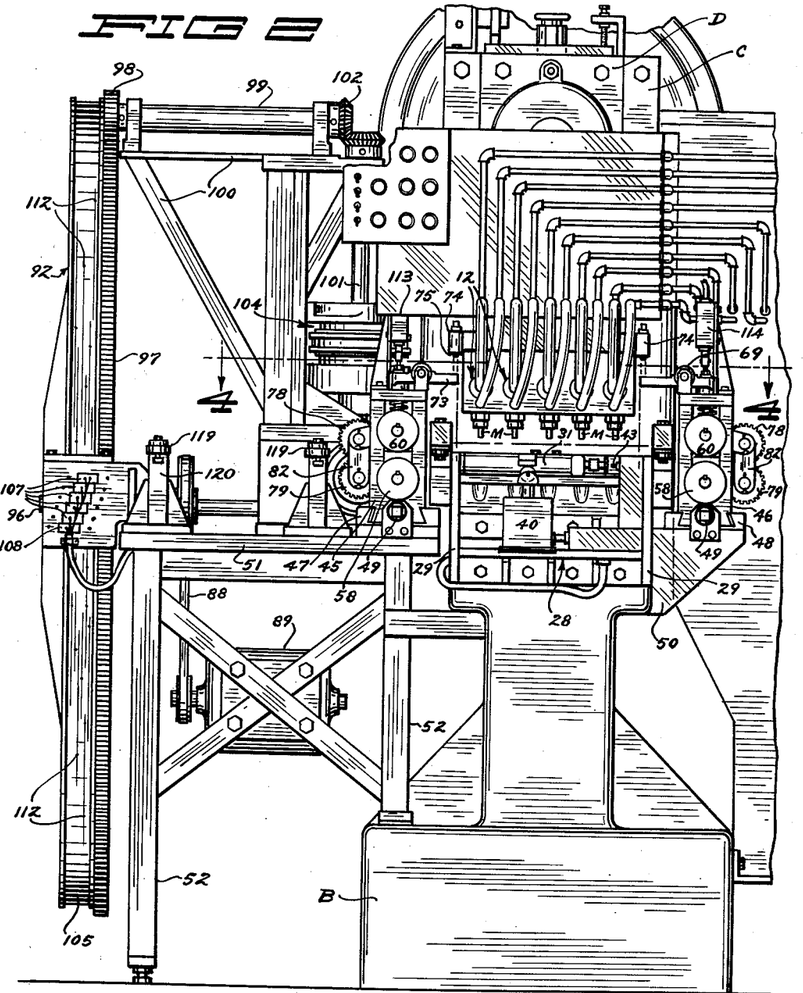
Fig. 2 is an enlarged front view.
Figure 6:
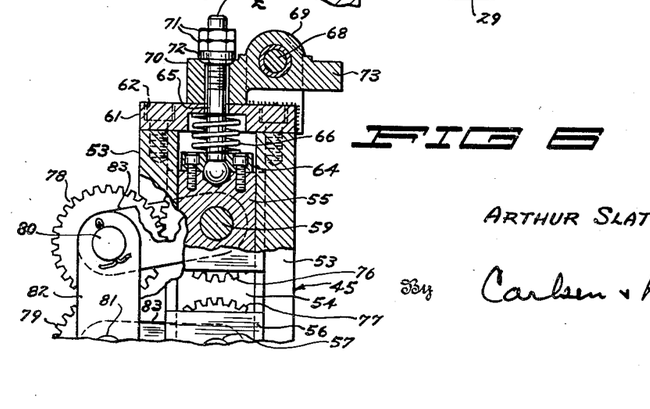
Fig. 6 is a further enlarged sectional detail view along the line 6—6 in Fig. 4.
Figure 7:
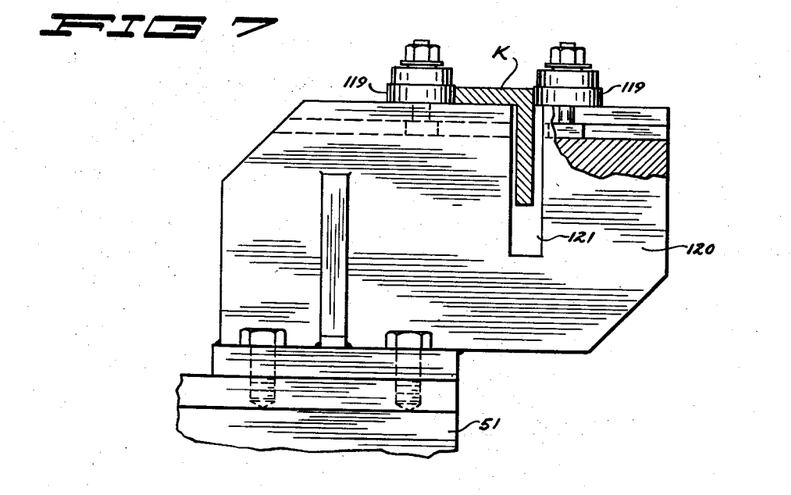
Fig. 7 is a fragmentary detail sectional view of one of the supports for the material entering the machine.
Figure 8:
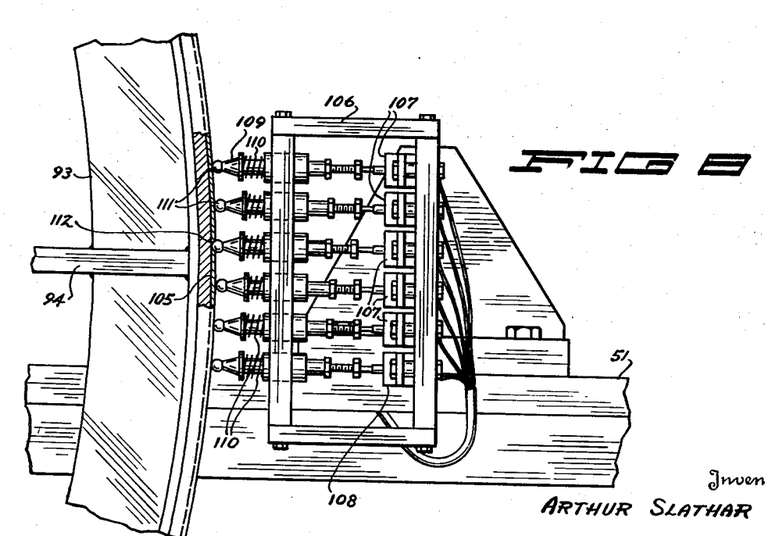
Fig. 8 is a greatly enlarged detail view of a part of the template wheel and the switches operated thereby.

The material K is fed into the machine in predetermined steps by a feed mechanism which includes end frames 45 and 46 sliding in dovetail slides 47—48 secured at opposite sides of the press below the ends of the die. Screws 49 permit these end frames 45—46 to be moved forwardly and rearwardly in the slides to properly align the feed mechanism, and the material, with the punches and die plate. The frame 46 to the right of the machine as viewed in Fig. 2, is mounted on a bracket 50 while the frame at the opposite side, and at the side into which the material K is fed, is mounted upon a base plate 51 suitably secured to the press and supported upon rigidly braced legs 52. Each end frame comprises front and rear pairs of upright, parallel legs 53 forming vertical spaces 54 to accommodate upper and lower bearings 55 and 56. The lower bearings 56 are secured in place and journal a lower feed roll shaft 57, at the forward end of which is a lower feed roll 58. The upper bearings 55 are arranged to slide vertically in the spaces 54 between the front and rear legs 53, and then journal an upper feed roll shaft 59 carrying an upper feed roll 60 at its forward end. The upper ends of the legs 53 are capped by a plate 61 secured in place by cap screws 62 as seen in Fig. 6, and also, as there shown, the upper bearings 55 are each provided with pins 63 having ball shaped lower ends held to the bearings by plates 64. These pins 63 extend upward loosely through openings 65 in the cap plate 61 and expansion coil springs 66 surround the pins and are braced between the bearings and the cap plates. Thus these springs 66 urge the bearings 55 downwardly and yieldably hold the upper feed roll 60 down against the lower. However, as the material K is pushed into the rolls the upper roll may move upward to accommodate the material while causing both rolls, which have roughened peripheral surfaces, to maintain feeding engagement with the material, as will be readily understood.

For releasing the feed pressure of the rolls 58—60 upon the material as the punches M actually enter the work, I provide upon the cap plate 61 a pair of forwardly and rearwardly spaced bearings 67 in which are pins 68 forming pivots for a rocker 69. This rocker has projecting apertured lugs 70 loosely passing the upper ends of the pins 63 and nuts 71 are screwed on the pins to adjustably hold collars 72 down against the upper surfaces of these lugs. The rocker 69 also has an oppositely projecting lug 73 and mounted upon the lower side of the punch slide D, is a bracket 74 carrying a finger 75. The arrangement is such that, as the slide moves downward on its working stroke this finger 75 will strike the lug 73 and move it downward, turning the rocker 69 on its pivots 68, and lifting the lugs 70, and so pulling upward on the pins 63. This movement is properly timed with the punch stroke to relieve the feed pressure of the upper rollers while the punch penetrates the work, of course, and as soon as the punch leaves the work the rocker moves back and restores the feed pressure.

Between the front and rear frame legs 53 the upper and lower feed roll shafts 59 and 57 carry gears 76—77 which mesh individually with meshing gears 78—79 so that the feed roll shafts will necessarily rotate in opposite directions. The gears 78 and 79 are journaled by short stub shafts 80—81 in yokes 82 and these shafts are further connected by links 83 to the respective feed roll shafts. This arrangement is well known and is for the purpose of maintaining the gear drive between the shafts as the upper feed roll moves up and down.

The feed roll mechanism just described is duplicated in its entirety on the opposite side of the machine and corresponding parts for both assemblies are designated by the same reference characters.

Figure 1:
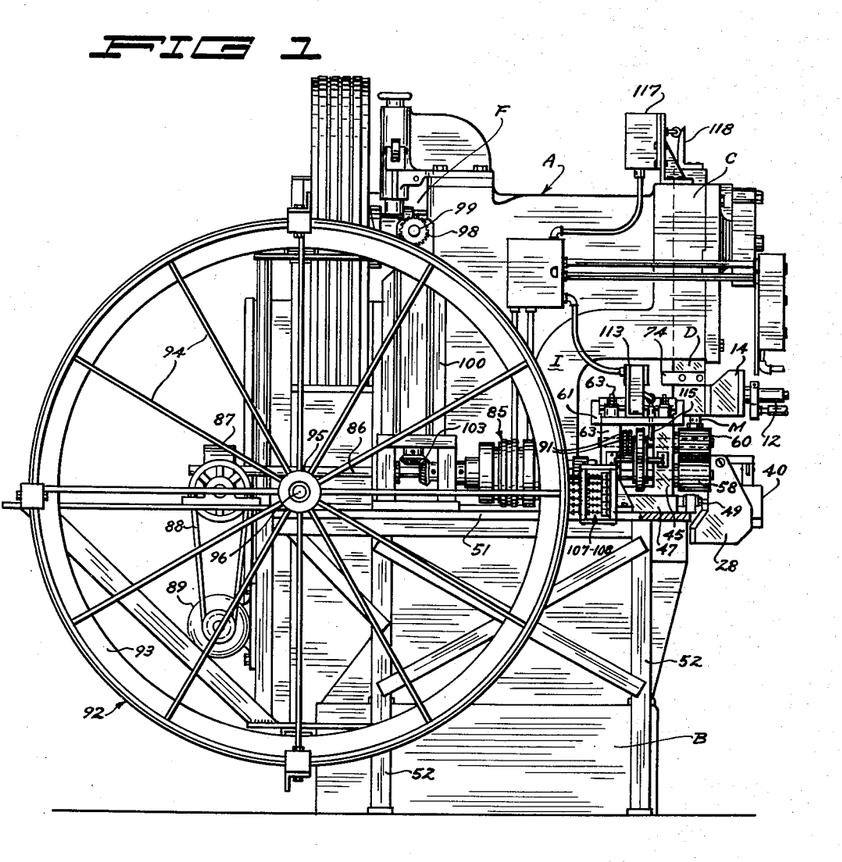
Fig. 1 is a side elevation of a complete machine, i. e., a punch press and the control and feed mechanism of my invention, viewing the same from the side at which the material is fed into the machine.
Figure 3:
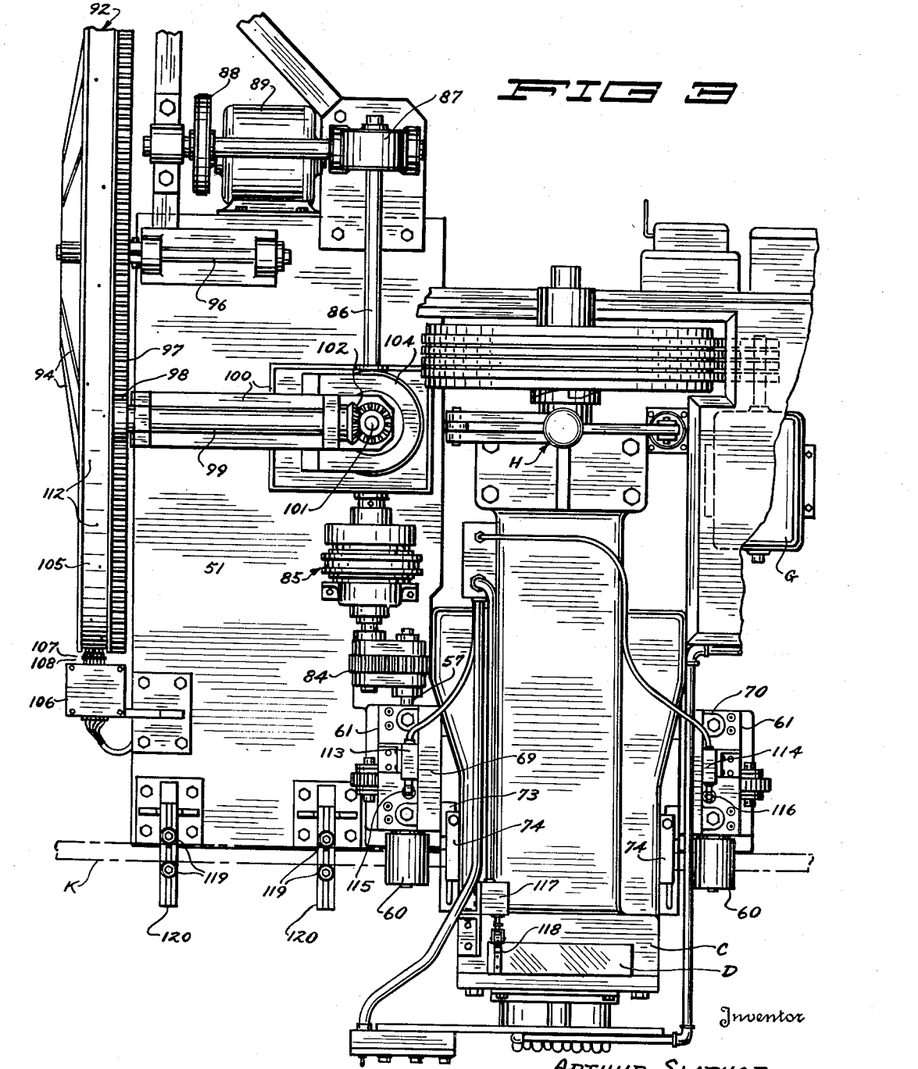
Fig. 3 is a plan view, certain parts being broken away and a piece of material passing through the machine being shown in broken lines.

At the side over the base plate 51 the lower feed roll shaft 57 is connected through gears 84 to a conventional magnetic clutch-brake unit 85 of the type which applies and releases a brake as the clutch is respectively declutched and clutched, in order to provide controlled instantaneous starting and stopping of the driven shaft, which in this case is connected to the feed rolls. This clutch unit 85 has its drive shaft 86 connected through a gear box 87 and belt and pulley drive 88 to a drive motor 89, which of course will thus drive the feed rolls under control of the clutch. Since the details of the layout and bearings for these drive elements are unimportant they will not be described further, but they are clearly shown in Figs. 1, 2 and 3 of the drawing.

The feed assemblies are connected and both driven by parallel sprocket chains 90 extending across to the rear of the die surface through the space J and running over sprockets 91 upon the upper feed roll shafts 59, thus operating the feed rolls 58—60 at both sides of the machine in the same direction.

The primary control element for the mechanism of my invention is a moving template or index comprising a large wheel, designated generally at 92, which rotates in timed relation and synchronism with the operation of the feed rolls. This wheel has a rim 93 joined by spokes 94 to a hub 95 by which it is secured upon a shaft 96 journaled upon the base plate 51 placing the wheel alongside the press. The wheel is driven from the motor 89 and for this purpose a large ring gear 97 is secured to the wheel and meshing therewith is a pinion 98 upon a drive shaft 99 supported by a bearing and bracket structure 100 erected upon the base plate. A vertical shaft 101 is geared at 102 and 103 respectively to the drive shafts 99 and 86 and on this shaft 101 there is another magnetic clutch-brake unit 104 by which the wheel may be independently started and stopped. The template, per se, is an annular band or strip 105 which is smoothly mounted around the wheel 92 to travel therewith, and which is removable for replacement with others for different set-ups. Operated by this template 105 is a plurality of micro-switches arranged upon a supporting panel and bracket assembly 106 secured upon the edge of the base plate 51. Thus are six of such switches, five being designated at 107 and hereafter called the selecting switches, and one being indicated at 108 and called the indexing switch. The switches are identical and have actuating plungers 109 extending radially toward the peripheral surface of the template and urged by springs 110 into light riding contact at their ball-pointed ends 111 with that surface. When so riding, the plungers 109 keep the switches open but the template 105 has shallow surface irregularities here shown as recesses indicated throughout at 112, which, as they register with the plunger end during the travel of the wheel, will allow the plunger to move slightly in an endwise direction. Such movement closes the switches.

Attention is called to the fact that the switches 107—108 are spaced transversely with respect to the traveling template, so that by properly locating the recesses 112 with respect to the width of the template the switches may be independently operated, each at times determined by the angular distance between the rows of such recesses. The purpose will be presently made clear.

The upward movement of the upper feed roll shafts 59 as the material enters and travels between the rolls is utilized to actuate separate limit switches 113 and 114 both of which are conventional. These switches are mounted on the feed assemblies at opposite sides of the machine for individual operation as the material enters and leaves, and they are actuated by the upward movement of pins 115—116 which depend slidably through the cap plates 61 so that the upper feed rolls shafts will engage and elevate the pins. Another limit switch 117, also conventional, is mounted atop the press guide C and a finger 118 on the slide D operates this switch once for each working cycle of the punch.

The material K is supported and guided as it enters the feed mechanisms (and as it leaves if required) by guide rollers 119 mounted to engage its opposite sides, upon slotted brackets 120 secured on the base plate 51. The slots provide obvious adjustment for the rollers according to the width of the material being punched.

While certain control or instrument panel and switch elements are shown in the drawing as they appear upon the complete machine they are not referred to in detail herein since they are not material to an understanding of the invention per se.

*Operation*

It will now be understood that, properly controlled and timed electrically, the feed mechanism will operate mechanically to grasp the end of the material K, whatever it may be, and feed it endwise over the die surface. By stopping this feed motion at desired intervals and actuating the punch press clutch H the material may be perforated or otherwise operated upon, and by selection of the proper punch M for each operation, openings of different sizes and shapes may be made as required. As each punch enters the material the fingers 75 will operate the rockers 69 and relieve the pressure of the feed rolls 58—60 upon the material so that it will not buckle or warp. It is believed that the mechanical functioning of the mechanism will be apparent without further explanation.

Figure 9:
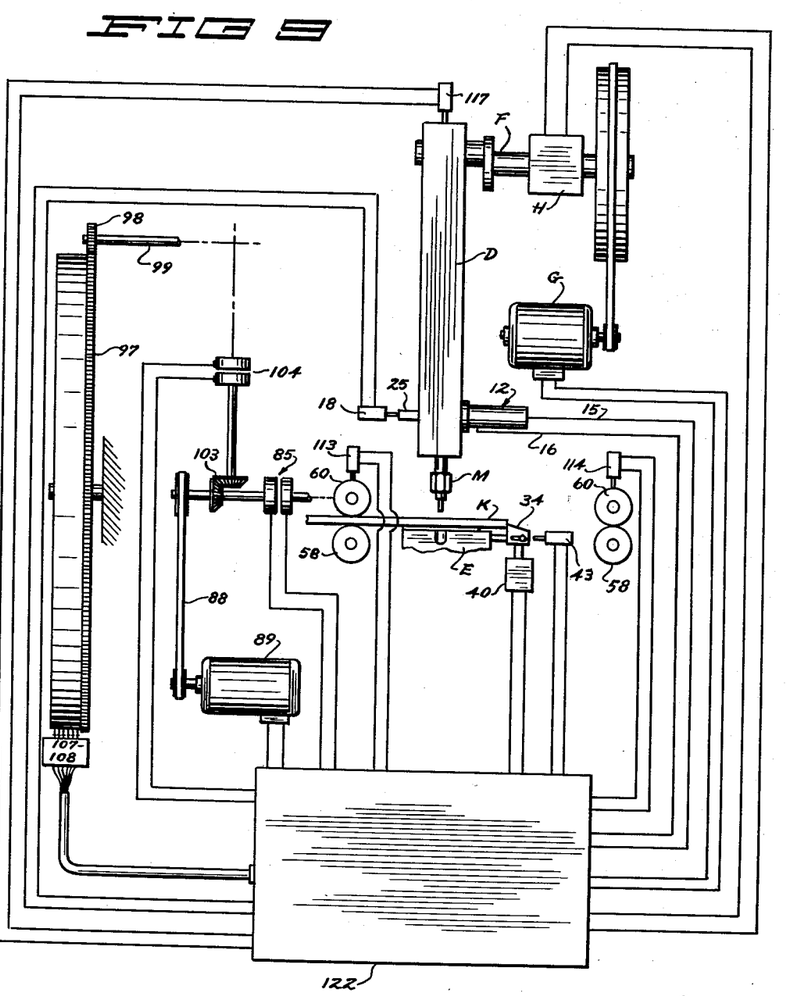
Fig. 9 is a schematic view of certain elements of the machine and control elements actuated thereby.

As to the automatic, electrically controlled functioning of the parts it will first of all be understood that electrical circuits may be arranged in different ways to accomplish generally the same results with the mechanism and, referring particularly to Fig. 9, I show a schematic layout of the parts from which many electrical circuit details are omitted for the sake of clarity. For example several relays will be necessary, one or more rectifiers will be provided for supplying direct current for the clutch-brake units 85—104, and other kindred and commonly known electrical elements will be embodied in the complete system. I have accordingly shown a diagram block or box 122 to indicate these commonly known elements and have simply indicated conductors leading thereto from the various switches. I shall now describe one workable sequence of the operation of all of the elements actually shown as simply as possible.

Assuming that the machine has been set up for operation upon the particular material at hand, and a template 105 placed on the wheel, with the switch actuating recesses 112 located as required by the openings to be punched, the motors G and 89 are started up and the end of this first piece of material is placed against the feed rolls 58—60 at the feed side of the machine. At this time the feed roll clutch 85 is engaged and the feed rolls are in motion so that the material will be fed in over the die surface. At this time furthermore the solenoid 40 is energized and the stop 34 is located, in its previously adjusted position, in the path of the end of the advancing material. The limit switch 113 has the function of so energizing the solenoid 40, as the material enters the feed rolls at that side so that this stop 34 is properly positioned as soon as the material starts into the machine. The feed motion continues until the material engages and slightly advances the stop which movement then actuates the micro-switch 43. This switch controls a circuit for disabling or deenergizing the feed rolls clutch 85 so that the feed motion now halts, and at the same time the circuit to the solenoid 40 is opened allowing the spring 37 to pull the stop 34 out of the way of the now temporarily halted material. At this moment also a circuit is closed to the template wheel clutch 104 and the wheel is revolved until the indexing micro-switch 108 encounters a recess 112 located in its path and this switch is operated. This indexing switch now re-energizes the feed roll clutch 85 and the feed motion restarts and proceeds until a recess 112 properly located on the template engages and operates one of the selecting micro-switches 107. As any one of such switches is thus operated it closes a circuit to a solenoid valve (in block 122) and operates one of the fluid motors 12 forcing the associated wedge bar 10 back and selecting one of the punches M. Since there are five switches 107 any one of the five punches M may be selected, according to the position of the recess 112 with reference to the width of the template. Simultaneously as one of the switches 107 make this punch selection it may also de-energize the clutches 85 and 104 stopping the feed rolls and the wheel. Thus the material feed is stopped at a point on the material, determined by location of the first recess 112 on the template with reference to the indexing recess. This point on the material is also predetermined and selected with reference to the end of the material, which through action against the stop 34 has previously stopped the feed then transferred control thereof to the template wheel.

The material is now at rest but as the punch M is selected the rearward movement of the wedge bar end 25 trips the limit switch 18 and this switch may operate the punch clutch H causing the punch to go through one working cycle and punch the first opening at the desired point. To then restart the feed rolls the limit switch 117 may be used, and the cycle will then be repeated, the punch being selected and the punch point located by the position of the next recess 112 both angularly and transversely as previously described. As the material leaves the machine it finally allows the feed rolls 58—60 on the departure side to move together and the resulting action of the limit switch 114 may be used to bring the wheel to a halt and condition the machine for entrance of the next piece of material for repeat of the above described operation.

Obviously the wheel 92 must be operated in timed relation or definite ratio to the operation of the feed rolls but this timing or ratio may be chosen according to the length of the material. On the other hand if a large wheel is used, and short lengths of material are being punched, then several short templates may be arranged end to end about the wheel.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. For a press having a punch and a die surface, automatic material feed mechanism, comprising in combination, feed rolls for engaging and feeding the material over the die surface, drive means for the feed rolls, an electric control system for the drive means and for the punch and operative to halt the feed rolls then operates the punch and again start the rolls, and said electric control system including a rotary template having radial irregulatrities on its surface at predetermined intervals and at least one switch operated by said irregularities to cyclically operate the feed rolls and punch.

2. For a press having a punch and a die surface, automatic material feed mechanism, comprising in combination, feed rolls for engaging and feeding the material over the die surface, drive means for the feed rolls, an electric control system for the drive means and for the punch and operative to halt the feed rolls then operate the punch and again start the rolls, the said system including a circular rotating template having depressions at selected intervals in its surface, and at least one micro-switch operated by contact with said depressions as the template rotates to stop the feed rolls and operate the punch.

3. For a press having a punch and a die surface, automatic material feed mechanism, comprising in combination, feed rolls for engaging and feeding the material over the die surface, drive means for the feed rolls, an electric control system for the drive means and for the punch and operative to halt the feed rolls then operate the punch and again start the rolls, and means adjustably positionable in the path of the material as its end enters the roll for starting the first cycle of operations.

4. For a press having a punch and a die surface, automatic material feed means of the character described and comprising in combination, power driven feed rolls for feeding the material endwise across the die surface, an electric control system for controlling the feed rolls and punch, adjustable stop means positionable in the path of the material as it is fed, and a switch operative as the material strikes said stop means to halt the feed rolls, and means for restarting the feed rolls to travel the material through the press in predetermined steps.

5. For a press having a punch and a die surface, automatic material feed means of the character described and comprising in combination, power driven feed rolls for feeding the material endwise across the die surface, an electric control system for controlling the feed rolls and punch, a stop adjustably positionable in the path of the material as it is travelled by the feed rolls, the said stop being supported for limited movement by the material, a switch controlled by such movement of the stop to halt the feed rolls, and means operative in timed relation to this operation by the stop to remove the stop from the path of the material and restart the feed roll.

6. For a press having a punch and a die surface, automatic material feed means of the character described and comprising in combination, power driven feed rolls for feeding the material endwise across the die surface, an electric control system for controlling the feed rolls and punch, a stop movably supported over the die surface in the path of the material as it is fed by the rolls and said stop being movable by the material as it travels, a switch circuit operative by such movement of the stop to halt the feed rolls, a solenoid connected to move the stop into and out of the path of the material, and a switch circuit operative to actuate the solenoid to remove the stop from the path of the material and restart the feed rolls.

7. Automatic feed mechanism for feeding material into a power machine and performing operations upon the material at predetermined points along its length, comprising power operated feed rolls for feeding the material, a material engaging member operative by the material as it is fed for halting the rolls and locating the point for the first operation with reference to the end of the material, and a movable template operative then to take over control and halt the feed rolls at predetermined intervals and locate the points of further operations upon the material.

8. Automatic feed mechanism for feeding material into a power machine and performing operations upon the material at predetermined points along its length, comprising power operated feed rolls for feeding the material, a material engaging member operative by the material as it is fed for halting the rolls and locating the point for the first operation with reference to the end of the material, means including a template for also controlling operation of the feed rolls and halting them at preselected intervals, and means operating in timed relation to the first operation on the material for transferring control of the feed rolls from the material engaging member to the template.

9. Mechanism for feeding material into a punch press of the type having a punch slide with multiple punches, comprising in combination, feed rolls for moving the material into the press, an electrically operated control circuit for intermittently feeding the material to predetermined points and operating the punch each time the material is halted, and said circuit including as primary control elements a rotary wheel and a series of switches arranged in operative relation with the periphery of the wheel and spaced apart crosswise of the direction of travel thereof, and the said wheel having irregularities in its periphery spaced both crosswise and angularly to operate the switches and preselect not only the feed intervals of the material but the particular punch brought into operation when the material is halted.

10. Mechanism for feeding material into a punch press of the type having a punch slide with multiple punches, comprising in combination, feed rolls for moving the material into the press, electrically operated control circuit for intermittently feeding the material to predetermined points and operating the punch each time the material is halted, and said circuit including a series of switches operative in the circuit to select one of the punches, halt the feed rolls, and operate the punch slide, and a template wheel rotating adjacent the switches and having surface irregularities at predetermined locations for operating the switches.

11. Mechanism for feeding material into a punch press and punching the material at predetermined points along its length, comprising feed rolls for moving the material into the press, a motor for operating the feed rolls, a rotary template wheel, separate clutch and brake units for connecting the motor to the feed rolls and to the wheel, an electrical control circuit including means actuated when the material has traveled a preselected distance to actuate one clutch unit and stop the feed rolls, said circuit also including means for actuating the punch to punch the material at a definite distance from this point and to operate the other clutch unit to set the wheel in motion, and means operative by rotation of the wheel to periodically operate the clutch units and punch in such manner as to punch the material at selected distances along its length and with reference to the point at which it is first punched.

12. Mechanism of the character described for feeding material into a punch press and punching the material at preselected intervals along its length, comprising in combination, feed rolls for intermittently feeding the material, control mechanism for the feed rolls and including a stop operated by the material to locate the point with reference to the end of the material at which first punch operation is made, said control mechanism further including a rotary template wheel and means operative as the wheel rotates to start and stop the feed rolls at predetermined intervals, and indexing means for locating the first of the series of operations of the feed rolls under control of the wheel with reference to the said first punch operation.

13. Mechanism for feeding material to a punch press and stopping the material for punching at desired intervals, comprising feed rolls for engaging and feeding the material, means operative by the travel of the material for stopping it at a first point for a first punch operation, a control circuit including at least one control switch and an indexing switch for controlling the feed rolls, a rotary template wheel having a series of recesses spaced around its rim for operating the control switch and stopping the feed rolls for punch operations at intervals determined by the angular distance between the said recesses, and said wheel having at least one indexing recess for operating the indexing switch and transferring control of the feed rolls to the control switch after the first punch operation and at a definite angular relationship to the recesses operating the control switch.

14. Mechanism for operating and controlling material feed mechanism in a punch press, comprising a motor, a wheel, separate electric clutch-brake units for selectively connecting the motor to the feed mechanism and to the wheel, and means for controlling said clutch-brake units including a series of switches, and means on the wheel for operating the switches as the wheel rotates.

15. For a punch press having a reciprocable slide, a feed mechanism for feeding material past the slide, a plurality of punches carried by the slide, mechanism for selecting said punches and extending selected punches toward the material for punching the same responsive to movement of the slide, and mechanism for automatically regulating the feed mechanism to intermittently move the material in predetermined steps past the slide as the punches are selected.

16. For a press having a punch and a die surface, automatic material feed mechanism, comprising in combination, feed rolls for engaging and feeding the material over the die surface, drive means for the feed rolls, an electric control system for the drive means and for the punch and operative to halt the feed rolls then operate the punch and again start the rolls, means adjustably positionable in the path of the material as its end enters the rolls for starting the first cycle of operations, and means for relieving feed pressure between the rolls and material as the punch enters the material.

17. For a press having a punch and a die surface, automatic material feed mechanism, comprising in combination, feed rolls for engaging and feeding the material over the die surface, drive means for the feed rolls, an electric control system for the drive means and for the punch and operative to halt the feed rolls then operate the punch and again start the rolls, means adjustably positionable in the path of the material as its end enters the rolls for starting the first cycle of operations, means exerting yieldable feed pressure between the rolls and material, and means operated by the punch for relieving such feed pressure as the punch strikes the material.

18. For a punch press having a punch and a die surface, automatic material feed means of the character described and comprising in combination, power driven feed rolls adapted to receive material between them and feed said material across the die surface, an electrical control system for the feed rolls and punch including an adjustable stop means positionable in the path of material traveling across the die surface, a switch operative as the material strikes said stop means to halt the feed rolls, means for restarting the feed rolls to feed the material intermittently, and means operative as material is entered between the feed rolls for initially positioning the stop means in the path of the material.

19. For a punch press having a punch and a die surface, automatic material feed means of the character described and comprising in combination, power driven feed rolls adapted to receive material between them and feed said material across the die surface, an electrical control system for the feed rolls and punch including an adjustable stop means positionable in the path of material traveling across the die surface, said stop means being supported for limited movement on contact with the traveling material, means operative by such movement of the stop means for withdrawing it from the path of the material and for halting the feed rolls, and means operative as material is entered between the feed rolls for positioning the stop means for contact by the traveling material.

20. Mechanism for feeding material into a punch press having a reciprocating slide, comprising power operated feed rolls for feeding the material, a template and an electrical control circuit for controlling the feed rolls to periodically stop the rolls and actuate the slide, and a switch forming part of said circuit and operated by the slide to restart the feed rolls after each punch operation.

21. For a punch press having a punch and a die surface, material feed means of the character described for feeding material intermittently into the press and comprising power operated feed rolls pairs at opposite sides of the die surface for feeding material onto and off of said surface, an automatic electrical control circuit for intermittently stopping the feed rolls and operating the punch and then restarting the rolls, said circuit including a switch for starting the automatic operation and operated as the material is placed between the feed rolls for movement onto the die surface and another switch for stopping such automatic operation and operated as the other feed rolls complete their movement of the material off the die surface.

22. In an automatic feed mechanism for a punch press, power operated feed rolls for traveling the material into the machine, an electrical control circuit for periodically halting the feed rolls and operating the press and then restarting the feed rolls, a stop member positionable in the path of the material as it enters the machine, switch means operative as the material engages said stop for placing the press and feed rolls under control of said circuit, and means on the press supporting the stop means for adjustment in a plane parallel with the direction of travel of the material through the press.

ARTHUR SLATHAR.

REFERENCES CITED

The following references are of record in the file of this patent:

UNITED STATES PATENTS

| Number | Name | Date |
| --- | --- | --- |
| 627,153 | Tennant | June 20, 1899 |
| 630,598 | Davis | Aug. 8, 1899 |
| 1,241,266 | Wurts | Sept. 25, 1917 |